US010959284B2

(12) United States Patent
He

(10) Patent No.: US 10,959,284 B2

(45) Date of Patent: Mar. 23, 2021

(54) BEAM FAILURE DETECTION AND INDICATION IN DRX MODE

(71) Applicant: QUALCOMM Incorporated, San Diego, CA (US)

(72) Inventor: Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/453,874

(22) Filed: Jun. 26, 2019

(65) Prior Publication Data

US 2020/0053824 A1 Feb. 13, 2020

Related U.S. Application Data

(60) Provisional application No. 62/716,328, filed on Aug. 8, 2018.

(51) Int. Cl.

*H04W 76/28* (2018.01)
*H04W 24/08* (2009.01)
*H04L 5/00* (2006.01)

(52) U.S. Cl.

CPC ........... *H04W 76/28* (2018.02); *H04L 5/0048* (2013.01); *H04W 24/08* (2013.01)

(58) Field of Classification Search

CPC . H04W 16/28; H04W 24/08; H04W 52/0216; H04W 76/18–19; H04W 76/28;

(Continued)

(56) References Cited

U.S. PATENT DOCUMENTS 8,315,214 B2 * 11/2012 Womack ............... H04W 76/28 370/329
10,548,182 B2 * 1/2020 Luo .................. H04W 52/0216

(Continued)

OTHER PUBLICATIONS

Huawei, et al., "Discussion on Wake Up Signal", 3GPP TSG RAN WG1 Meeting #88, 3GPP Draft; R1-1703333, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13, 2017-Feb. 17, 2017, Feb. 12, 2017 (Feb. 12, 2017), 3 Pages, XP051210463, Retrieved from the Internet: URL: http://www.3gpp.org/flp/Meetings_3GPP_SYNC/RAN1/Docs/ [retrieved on Feb. 12, 2017] Chapter 2.2.

(Continued)

*Primary Examiner* — Tri H Phan

(74) *Attorney, Agent, or Firm* — Procopio, Cory, Hargreaves & Savitch LLP

(57) ABSTRACT

The apparatus configured to provide an enhanced power management solution, by configuring the UE to perform a Beam Failure Detection (BFD) procedure in view of the DRX configuration of the UE and a periodicity of reference signal(s) used to assess a radio link quality. The apparatus receives a DRX configuration having a DRX period comprising a DRX on duration and a DRX off duration. The apparatus then determines a beam failure indication period based on a periodicity for reference signals (RSs) configured for beam failure detection and a DRX period. Then, the apparatus performs a radio link quality measurement of at least one of the RSs based on the beam failure indication period determined by the UE.

30 Claims, 13 Drawing Sheets

(58) Field of Classification Search
CPC ...... H04B 7/06; H04B 7/0617; H04B 7/0632; H04B 7/0695; H04B 17/00; H04B 17/21; H04B 17/309; H04B 17/17; H04L 5/00; H04L 5/0025; H04L 5/0048; H04L 5/005; H04L 5/0078
See application file for complete search history.

(56) References Cited

U.S. PATENT DOCUMENTS 10,813,157 B1* 10/2020 Bai .................. H04W 72/1284
10,820,271 B2* 10/2020 Tseng ................ H04W 52/0219
2015/0181450 A1 6/2015 Xin et al.
2018/0063883 A1* 3/2018 Nagaraja ........... H04W 52/0216
2019/0037498 A1* 1/2019 Tseng .................... H04W 76/19
2019/0281660 A1* 9/2019 Cui ....................... H04L 5/0094
2019/0394082 A1* 12/2019 Cirik ..................... H04L 5/0048
2019/0394660 A1* 12/2019 He ........................ H04W 76/18
2020/0205219 A1* 6/2020 Chen ..................... H04W 76/19

OTHER PUBLICATIONS

International Search Report and Written Opinion—PCT/US2019/039569—ISA/EPO—dated Sep. 23, 2019.
Oppo: "DRX in NR", 3GPP TSG-RAN2 #97, 3GPP Draft; R2-1700961-DRX in NR, 3rd Generation Partnership Project (3GPP), Mobile Competence Centre; 650, Route Des Lucioles; F-06921 Sophia-Antipolis Cedex; France, vol. RAN WG2, No. Athens, Greece; Feb. 13, 2017-Feb. 17, 2017, Feb. 4, 2017 (Feb. 4, 2017), 2 Pages, XP051223319, Retrieved from the Internet: URL: http://www.3gpp.org/ftp/tsg_ran/WG2_RL2/TSGR2_97/Docs/ [retrieved on Feb. 4, 2017] Chapter 2.1.

* cited by examiner

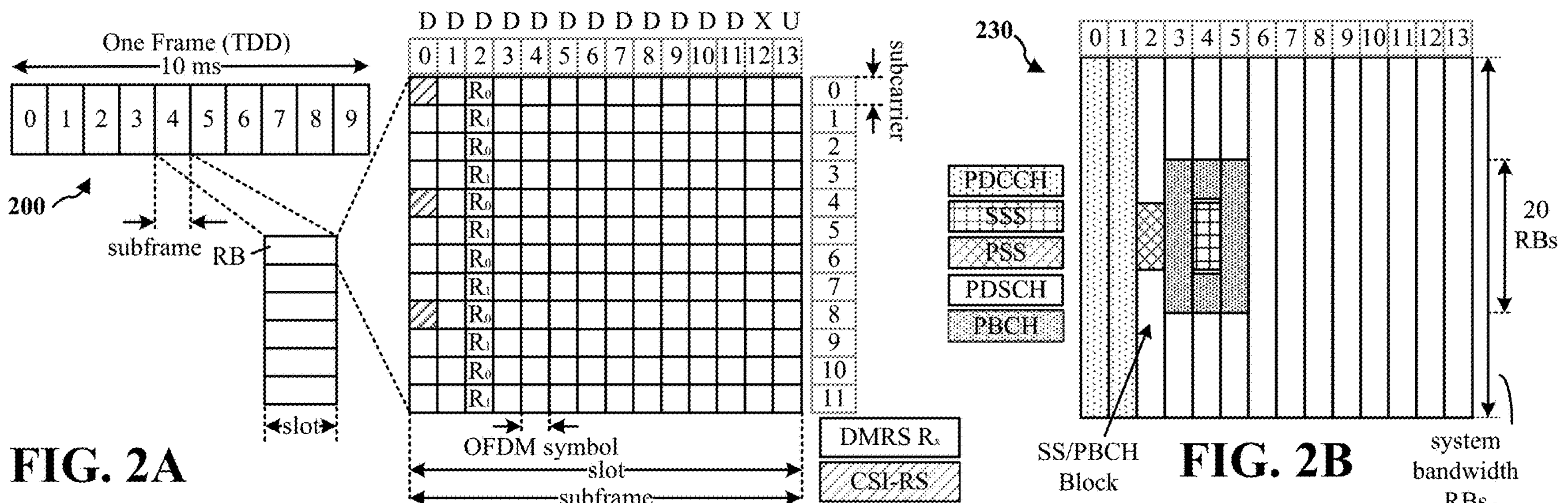
FIG. 2A
FIG. 2B
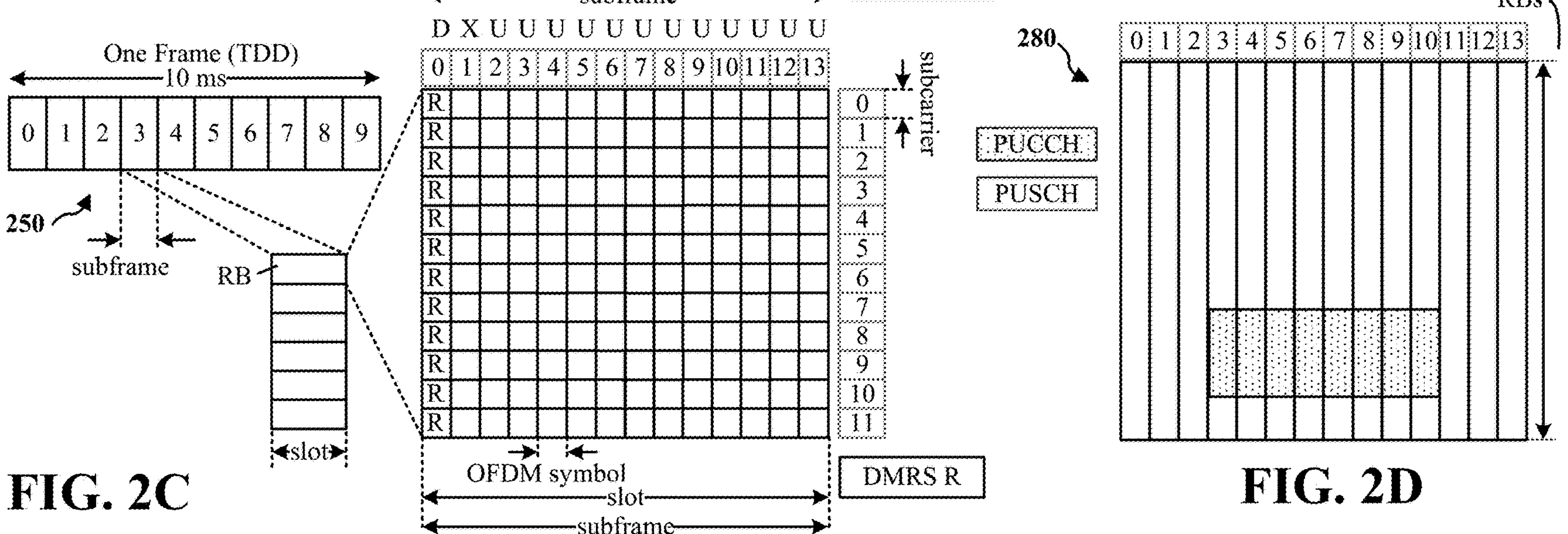
FIG. 2C
FIG. 2D

BEAM FAILURE DETECTION AND INDICATION IN DRX MODE

CROSS REFERENCE TO RELATED APPLICATION(S)

This application claims the benefit of U.S. Provisional Application Ser. No. 62/716,328, entitled "Beam Failure Detection and Indication in DRX Mode" and filed on Aug. 8, 2018, which is expressly incorporated by reference herein in its entirety.

BACKGROUND

Technical Field

The present disclosure relates generally to communication systems, and more particularly, to beam failure detection.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a UE. The apparatus receives a DRX configuration having a DRX period comprising a DRX on duration and a DRX off duration. The apparatus then determines a beam failure indication period based on a periodicity for reference signals (RSs) configured for beam failure detection and a DRX period. Then, the apparatus performs a radio link quality measurement of at least one of the RSs based on the beam failure indication period determined by the UE.

In another aspect of the disclosure, a method, a computer-readable medium, and an apparatus are provided for wireless communication at a base station. The apparatus determines a length of a DRX period for a UE based on a delay sensitivity of the UE. The apparatus configures the UE with a DRX configuration having the DRX period including a DRX on duration and a DRX off duration. The apparatus transmits periodic reference signals (RSs) configured for beam failure detection.

To the accomplishment of the foregoing and related ends, the one or more aspects may comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
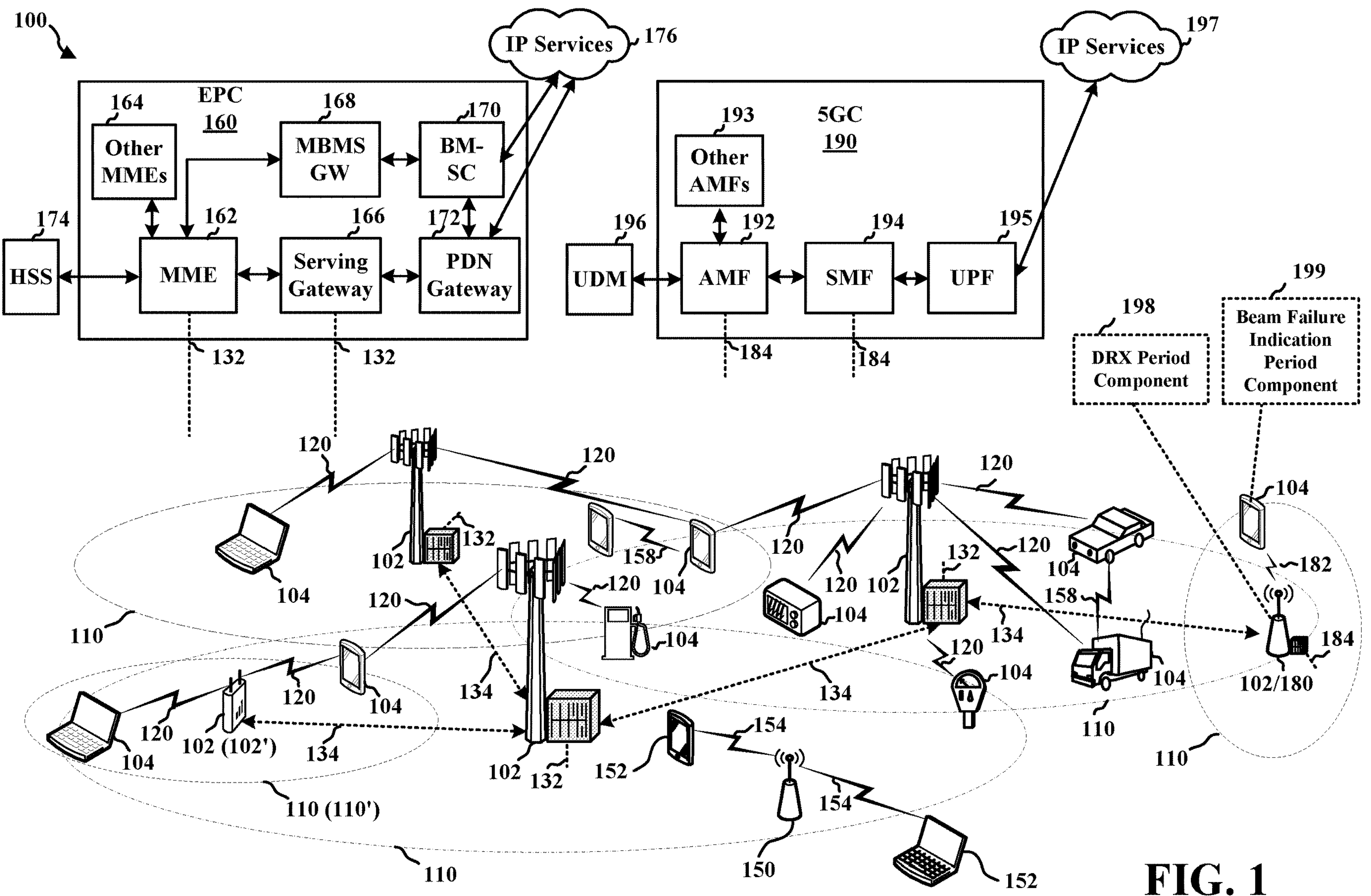
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a 5G Core (5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 180 may comprise a DRX period component 198 configured to determine a length of a DRX period for a UE, e.g. 104. In some examples, the length of the DRX period can be based on a delay sensitivity of the UE. The base station 108 can configure the UE with a DRX configuration having the DRX period. UE 104 may comprise a beam failure indication period component 199 configured to determine a beam failure indication period. For example, the base station 180 can configure the UE with the DRX period including the DRX on duration and the DRX off duration. The base station 180 may transmit, to the UE, the DRX configuration having the DRX period, e.g., a DRX period including the DRX on duration and the DRX off duration. The base station 108 may be configured to transmit, to the UE, periodic Reference Signals (RSs) configured for beam failure detection. The UE receives the DRX configuration from the base station, and is configured to determine a beam failure indication period based on a periodicity for RSs configured for beam failure detection and the DRX period. For example, the UE may assess radio link quality of the reference signals configured for beam failure detection once per failure indication period, which may be determined as the maximum between the shortest periodicity of the reference signals and the DRX period. The UE may be configured to perform a radio link quality measurement of at least one of the RSs. The radio link quality measurement may be based on the beam failure indication period determined by the UE. The UE may be configured to wake up prior to the DRX on duration of a DRX cycle to perform the radio link quality measurement. In some examples, the UE may detect a beam failure, and initiate a beam failure recovery procedure prior to the on duration of the DRX cycle. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^{\mu}$ slots/subframe. The subcarrier spacing and symbol length/duration are a function of the numerology. The subcarrier spacing may be equal to $2^{\mu}*15$ kKz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
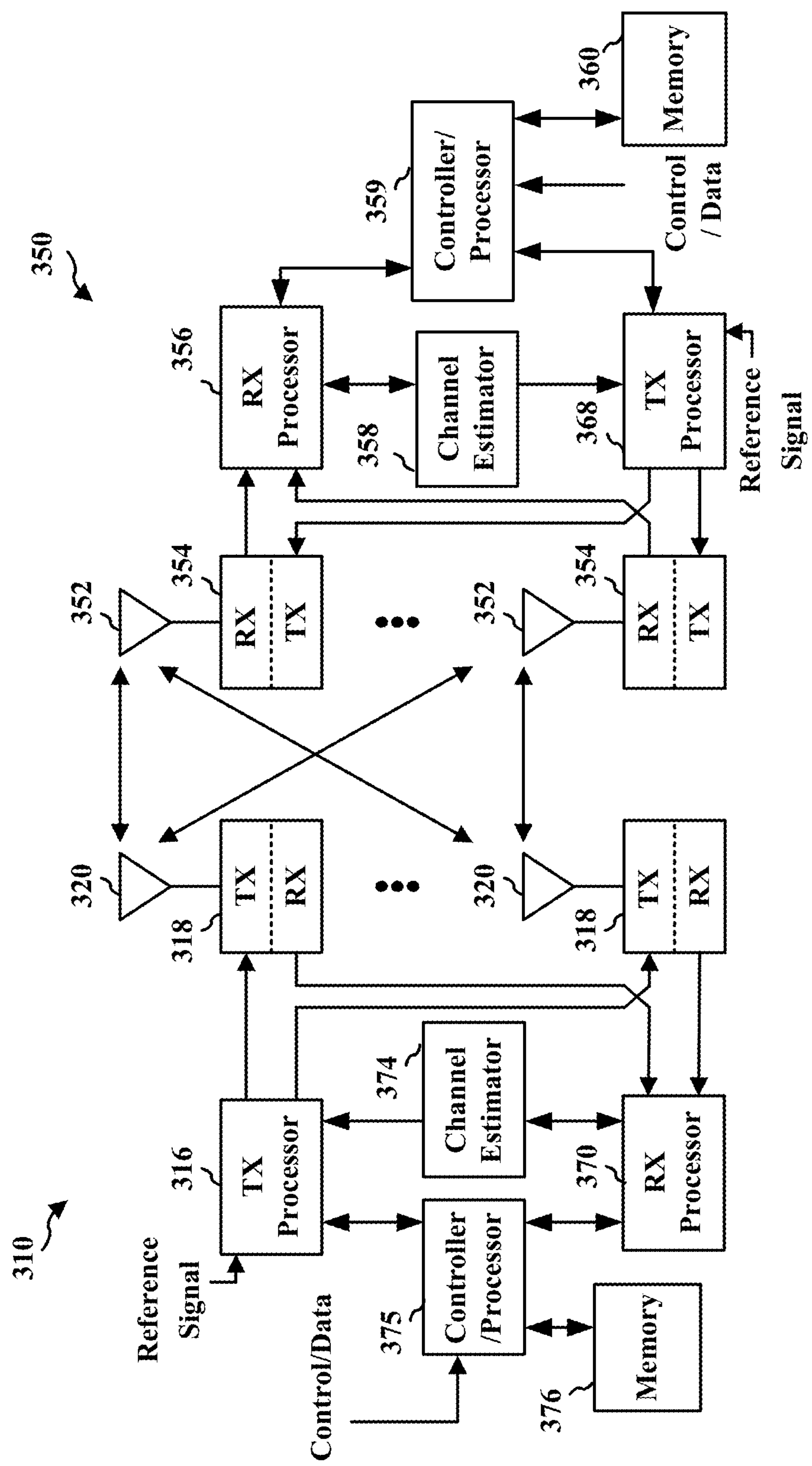
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 199 of FIG. 1.

At least one of the TX processor 316, the RX processor 370, and the controller/processor 375 may be configured to perform aspects in connection with 198 of FIG. 1.

Figure 4:
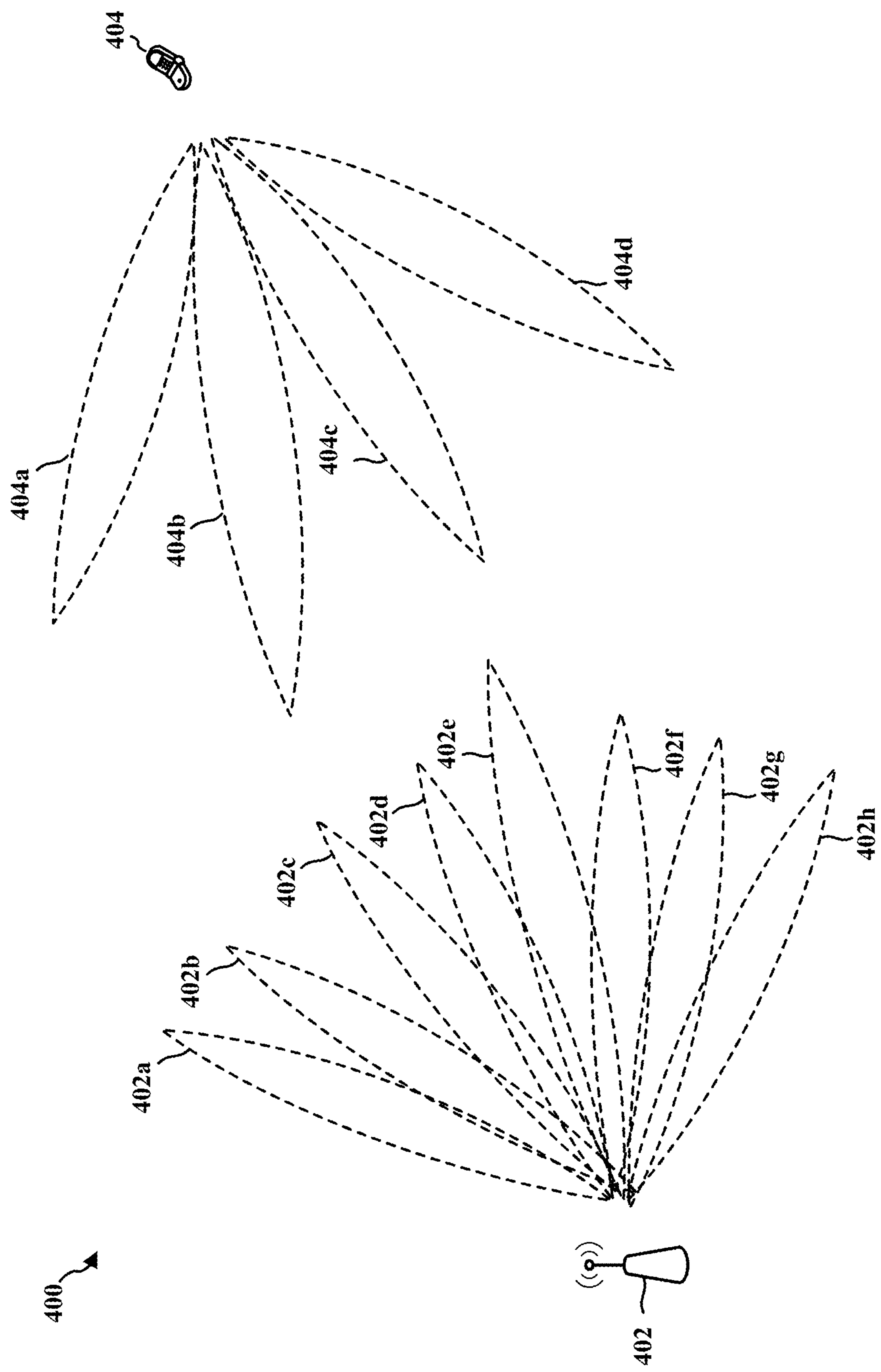
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 402*a*, 402*b*, 402*c*, 402*d*, 402*e*, 402*f*, 402*g*, 402*h*. The UE 404 may receive the beamformed signal from the base station 402 in one or more receive directions 404*a*, 404*b*, 404*c*, 404*d*. The UE 404 may also transmit a beamformed signal to the base station 402 in one or more of the directions 404*a*-404*d*. The base station 402 may receive the beamformed signal from the UE 404 in one or more of the receive directions 402*a*-402*h*. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

A UE may need to monitor the quality of the beams that it uses for communication with a base station. For example, a UE may monitor a quality of a signal received via reception beam(s). A Beam Failure Detection (BFD) procedure may be used to identify problems in beam quality and a Beam recovery procedure (BRF) may be used when a beam failure is detected. The BFD procedure may indicate whether a link for a particular beam is in-sync or out-of-sync. For monitoring active link performances, a UE may perform measurements of at least one signal, e.g., reference signal(s) (RS), for beam failure detection. The measurements may include deriving a metric similar to a Signal to Interference plus Noise Ratio (SINR) for the signal, or RSRP strength or block error rate (BLER) of a reference control channel chosen by base station and/or implicitly derived by UE based on the existing RRC configuration. The reference signal may comprise any of CSI-RS, Physical Broadcast Channel (PBCH), a synchronization signal (SS), or other reference signals for time and/or frequency tracking, etc. The UE may receive an indication of reference signal resources to be used to measure beam quality in connection with BFD. The UE may monitor the reference signal(s) and determine the signal quality, e.g., Reference Signal Received Power (RSRP) for the reference signal. In some cases, the UE may determine a configured metric such as block error rate (BLER) for a reference signal. The measurement(s) may indicate the UE's ability to decode a transmission, e.g., a DL control transmission from the base station.

Thresholds may be defined in tracking the radio link conditions, the threshold(s) may correspond to an RSRP, a BLER, etc. that indicates an in-sync condition and/or an out-of-sync condition of the radio link. An "out-of-sync" condition may indicate that the radio link condition is poor, and an "in-sync" condition may indicate that the radio link condition is acceptable, and the UE is likely to receive a transmission transmitted on the radio link. An Out-of-Sync condition may be declared when a block error rate for the radio link falls below a threshold over a specified time interval, e.g., a 200 ms time interval. An in-sync condition may be declared when a block error rate for the radio link is better than a threshold over a second, specified time interval, e.g., over 100 ms time interval. The thresholds and time intervals used to determine the in-sync condition and out-of-sync condition may be the same or may be different from each other. If the UE receives a threshold number of out-of-sync measurements over a period of time, the UE may declare a beam failure.

When a beam failure is detected, a UE may take appropriate actions to recover the connection. For example, after multiple out-of-sync measurements, the UE may transmit a beam failure recovery signal to initiate recovery of the connection with the base station. For example, the UE may be configured by RRC with a beam failure recovery procedure that is used to indicate to the base station that the beam failure has been detected.

As described in connection with FIG. 4, the base station 402 and UE 404 may communicate over active data/control beams both for DL communication and UL communication. The base station and/or UE may switch to a new beam direction using beam failure recovery procedures.

A UE may be configured by a base station for DRX. During an RRC connected state, when there is no data transmission in either direction (UL/DL), the UE transition to the DRX mode in which the UE discontinuously monitors the PDCCH channel, using a sleep and wake cycle. Without DRX, the UE monitors PDCCH in every subframe to check whether there is downlink data available for the UE. Monitoring of the PDCCH drains the UE's battery power. In a DRX mode, when the UE is in a sleep portion of the cycle, the UE does not monitor for PDCCH, which may save battery power.

The DRX configuration for a UE may be configured by the network in RRC signaling from a base station, e.g. in an RRC Connection Setup request or an RRC connection reconfiguration request.

A DRX configuration may include the configuration of any of a number of timers and values, e.g., any of an ON duration Timer, a DRX Inactivity Timer, a DRX Retransmission Timer, a DRX UL Retransmission Timer, drx-HARQ-RTT-TimerDL, drx-HARQ-RTT-TimerUL, a long DRX Cycle, a value of the DRX Start Offset, drx-Long-CycleStartOffset, a DRX Short Cycle Timer, a short DRX Cycle, drx-SlotOffset, etc. A DRX Cycle may comprise a periodic repetition of ON Duration in which the UE monitors PDCCH and an OFF Duration, which may be referred to as a DRX opportunity. During the OFF duration, the UE does not monitor for PDCCH. The UE may enter a sleep mode or low power mode in which the UE minimizes power consumption by shutting down a radio frequency (RF) function without detecting communication from the base station.

The DRX Inactivity Timer gives a time, e.g., in terms of TTI duration, after the UE successfully decodes PDCCH before the UE may again enter the OFF Duration. The On Duration Timer may give the number of consecutive PDCCH subframe(s) that need to be monitored/decoded when the UE wakes up from the OFF duration in DRX Cycle. The DRX Retransmission Timer may give a consecutive number of PDCCH subframe(s) for the UE to monitor when a retransmission is expected by the UE. A DRX short cycle may correspond to a first DRX cycle that the UE enters after successful expiration of DRX inactivity timer. The UE may be in the short DRX cycle until the expiration of DRX short cycle timer. After that, the UE may enter a Long DRX cycle. A DRX Short Cycle Timer may be a parameter that gives a number of consecutive subframe(s) that the UE shall follow the short DRX cycle after the DRX Inactivity Timer has expired.

Thus, after a successful attempt of DL data, a DRX Inactivity Timer may be started for a number of subframes. If there is any UL or DL data transmission during DRX Inactivity Timer the timer restarts again. If DRX Inactivity Timer expires without UL/DL activity, the UE may enter the DRX cycle to achieve power savings. The UE may start with a Short DRX Cycle. If a short cycle timer expires, the UE may enter a longer DRX cycle. The UE may further be able to transition to an idle mode DRX based on an RRC inactivity timer.

While DRX provides battery savings for a UE, DRX presents challenges for a UE performing BFD. A beam failure indication period may be set to be the maximum between the shortest periodicity of periodic CSI-RS configurations or SS/PBCH blocks in a set q, that the UE uses to assess the radio link quality and 2 msec. Under such guidelines, if the DRX period is longer than the shortest periodicity of the configured BFD RSs, then it is possible that there are multiple instances of RSs between two DRX on durations. If the beam failure indication period is a maximum between the shortest periodicity of RSs used to assess the radio link quality and 2 ms, the UE would have to wake up multiple times during DRX off duration to perform BFD. Such behavior reduces the power savings provided by DRX, especially when a beam failure indication period is short and the DRX cycle of the UE is long. Thus, the present application may allow for the BFD procedure to be skipped when the UE is in the DRX off duration by providing a different way to determine the beam failure indication period. The aspects presented herein enable a UE to benefit from the power savings of DRX while performing BFD. The new determination of the beam failure indication period avoids requiring the UE from having to wake up while in the DRX off duration to perform a BFD measurement, while ensuring that the UE measures the RSs for BFD during the DRX active time or on duration. If a beam failure is detected, then the UE sends an indication to initiate beam failure recovery features.

The UE may perform measurements of the RSs in a beam failure indication period, which may be based on the DRX period of the UE and the periodicity of the RSs that are configured for beam failure detection. In some examples, the beam failure indication period may be based on a maximum between a shortest periodicity for the RSs used to assess the radio link quality and the DRX period. In some examples, the periodicity of the RSs may be greater than the DRX period. This will lead the UE to perform the radio link quality measurement according to the periodicity of the RSs In other examples, the DRX period may be greater than the periodicity of the RSs. This will lead the UE to perform the radio link quality measurement according to the DRX period. For example, the UE may perform the radio link quality measurement once during the DRX period, e.g., during an ON duration.

Figure 5:
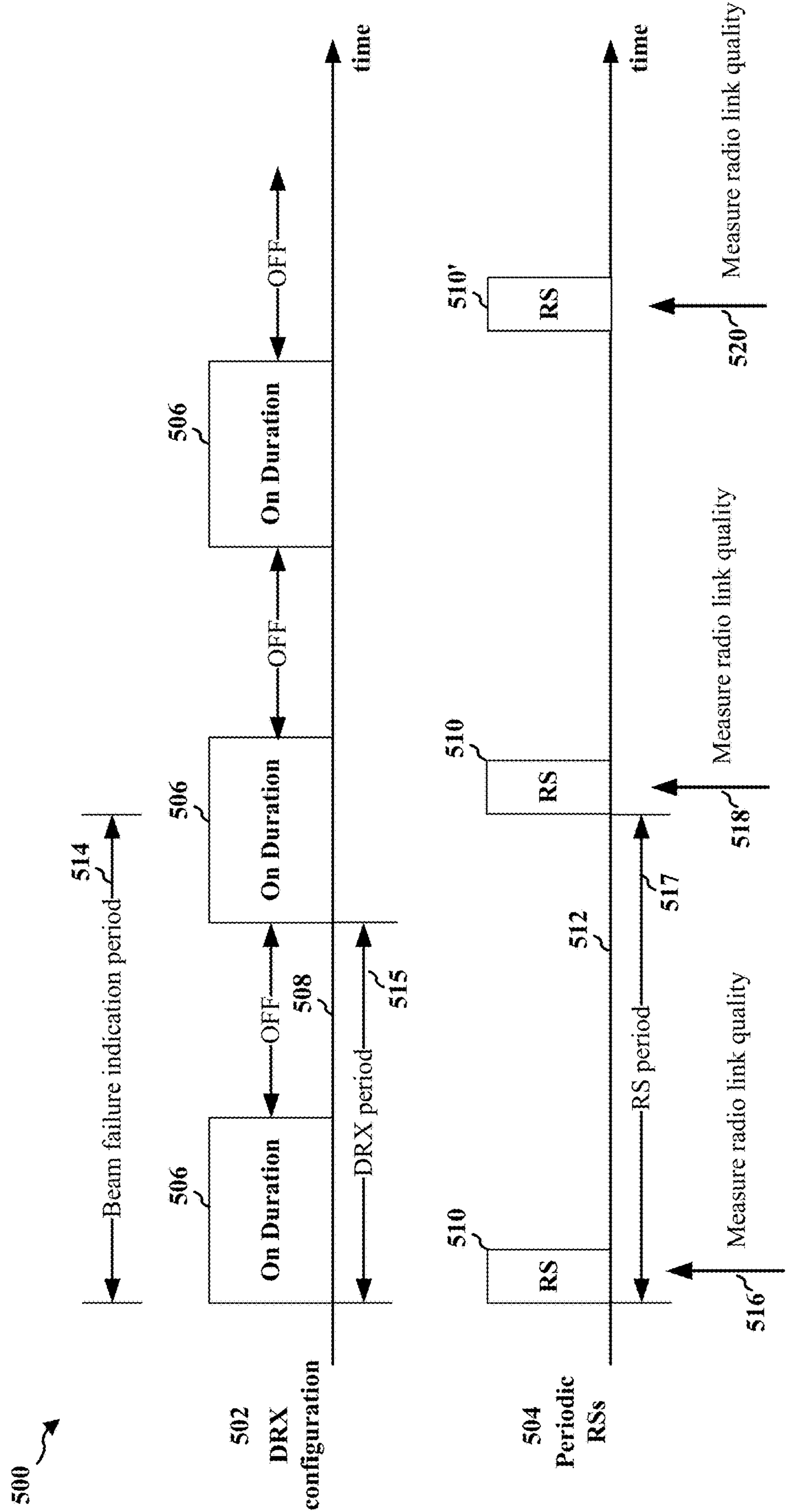
FIG. 5 illustrates an example of a DRX configuration in accordance with certain aspects of the present disclosure.

FIG. 5 illustrates an example 500 of a DRX configuration in accordance with certain aspects of the present disclosure. In the example 500 of FIG. 5, the UE has a DRX configuration 502 and the configuration for a periodic RS 504. The DRX period includes an on duration 506 and an off duration 508. The combination of the on duration 506 and the off duration 508 form a DRX cycle for the UE. The periodic RS 504 has a period extending between transmissions of the RS, as illustrated in FIG. 5. The network configures the DRX cycle of the UE, and configures the RS cycle of the periodic RSs. For on durations 506, the UE is in a power on state, such that the UE monitors the PDCCH to determine if the UE is scheduled to receive data from the network. During the off duration 508, the UE may enter a reduced power mode in which the UE does not monitor the PDCCH. While the first on duration 506 of the DRX period 515 of the UE is illustrated as being aligned with the periodic RS 504 such that the RS will be received by the UE during the ON duration, this is merely an example.

In the example of FIG. 5, the periodicity of the RSs is greater than the DRX period, e.g., the length of the RS period 517>the length of the DRX period 515.

The UE may determine a beam failure indication period 514 in which the UE will measure the radio link quality. The beam failure indication period 514 may be based on the DRX period of the UE and the periodicity of the RSs configured for beam failure detection. For example, the UE may determine the beam failure detection period as a maximum between a shortest periodicity for the RSs and the DRX period. In such instance, the UE compares the DRX period of the UE and the periodicity for the RSs. In the example of FIG. 5, the periodicity for the RSs (RS period 517) is greater than the DRX period 515. As such, the UE determines that the beam failure indication period 514 is based on the periodicity for the RSs. In such example, the UE may be configured to follow the periodicity of the RSs to perform BFD. The UE may perform radio link quality measurements while in the on duration 506 of the DRX period, and during transmission of the periodic RSs is an RS transmission window 510. For example, in some aspects, when the UE is in the on duration 506 of the DRX period and the periodic RSs 504 is in the RS transmission window 510, the UE may perform the measurement of the radio link quality at 516 and 518. In some aspects, since the RS period 517 is longer than the DRX period 515, the on duration of the UE may not align with an RS transmission window (e.g., 510'), such that the UE is in the OFF duration of the DRX period 515 and the UE will not be required to wake up during an OFF duration to measure the radio link quality. However, in some aspects, the UE may be configured, at times, to wake up during an OFF duration to measure the radio link quality, such as at 520. The UE may wake up during an OFF duration to measure the RS 510', but the network might not require the UE to do so. For example, the a base station may configure the UE to only measure radio link quality if the RS transmission window 510 overlaps with a DRX on duration 506. In one embodiment, the UE may measure a signal different than the Periodic RS during a DRX on duration 506 if the RS transmission window 510 does not overlap with a DRX on duration 506. The UE may determine, on its own, whether or not to wake up during an OFF duration to measure the RS 510'. Example measurement timing is illustrated at 516, 518, and 520.

Figure 6:
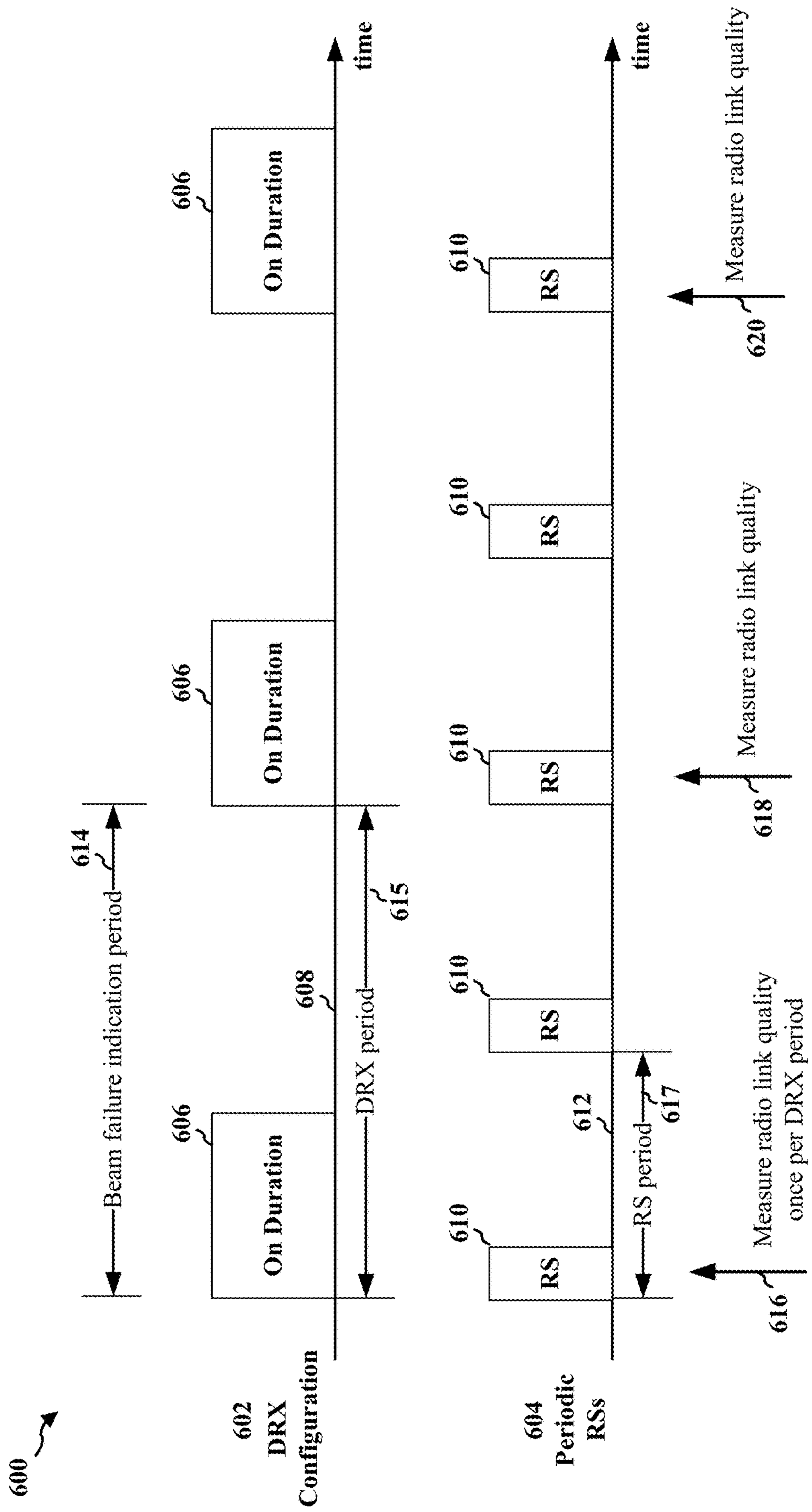
FIG. 6 illustrates another example of a DRX configuration in accordance with certain aspects of the present disclosure.

FIG. 6 illustrates another example 600 of a DRX configuration in accordance with certain aspects of the present disclosure. In the example 600 of FIG. 6, the UE has a DRX configuration 602 and the periodic RS 604. A DRX period 615 has an on duration 606 and an off duration 608. The combination of the on duration 606 and the off duration 608 forms a DRX cycle for the UE. The periodic RS 604 is transmitted in a periodic manner, with RS transmissions separated by RS period 617. The DRX period 615 and periodic RSs 604 may be configured in a manner similar to the DRX period 515 and periodic RSs 504, respectively, discussed above.

In the example of FIG. 6, the periodic RSs 604 has a period 617 that is shorter than the DRX period 615. As discussed in connection with FIG. 5, the beam failure indication period 614 may be based on the DRX period of the UE and the periodicity of the RSs configured for beam failure detection. For example, the UE may determine the beam failure detection period as a maximum between a shortest periodicity for the RSs and the DRX period. The UE compares the DRX period of the UE and the periodicity of the RSs, and determines that the DRX period is greater than the period of the RSs. In the example of FIG. 6, the beam failure indication period 614 would be based on the DRX period 615. In such an example, the UE may then be configured to measure the radio link quality a defined number of times, e.g., once, in the DRX cycle instead of measuring every instance of the RS in the DRX period. The UE may perform radio link quality measurement while in the on duration 606 of the DRX period. For example, at 616, the UE is in an on duration 606 of the DRX period 615, and may receive the periodic RSs 604 to perform the measurement of the radio link quality at 616, and similar measurements may be made at 618, 620. Since the periodicity of the RSs is less than the DRX period, the periodic RSs 604 may be transmitted more than once during the beam failure indication period 614. In some instances, the RS may be transmitted by the base station while the UE is in the DRX off duration 608 of the DRX period. As illustrated, the UE may skip measurement of the RS that are transmitted by the base station during the off duration and may instead measure link quality using a reference signal (which may be different than a periodic RS 604 within a RS transmission window 610) received during the on duration. This may avoid requiring the UE to wake up to make any radio link quality measurements while in the DRX off duration 608. The UE might not monitor the RS for BFD during the off duration 608 and may remain in a power off mode or power reduction mode while in the off duration 608.

Figure 7:
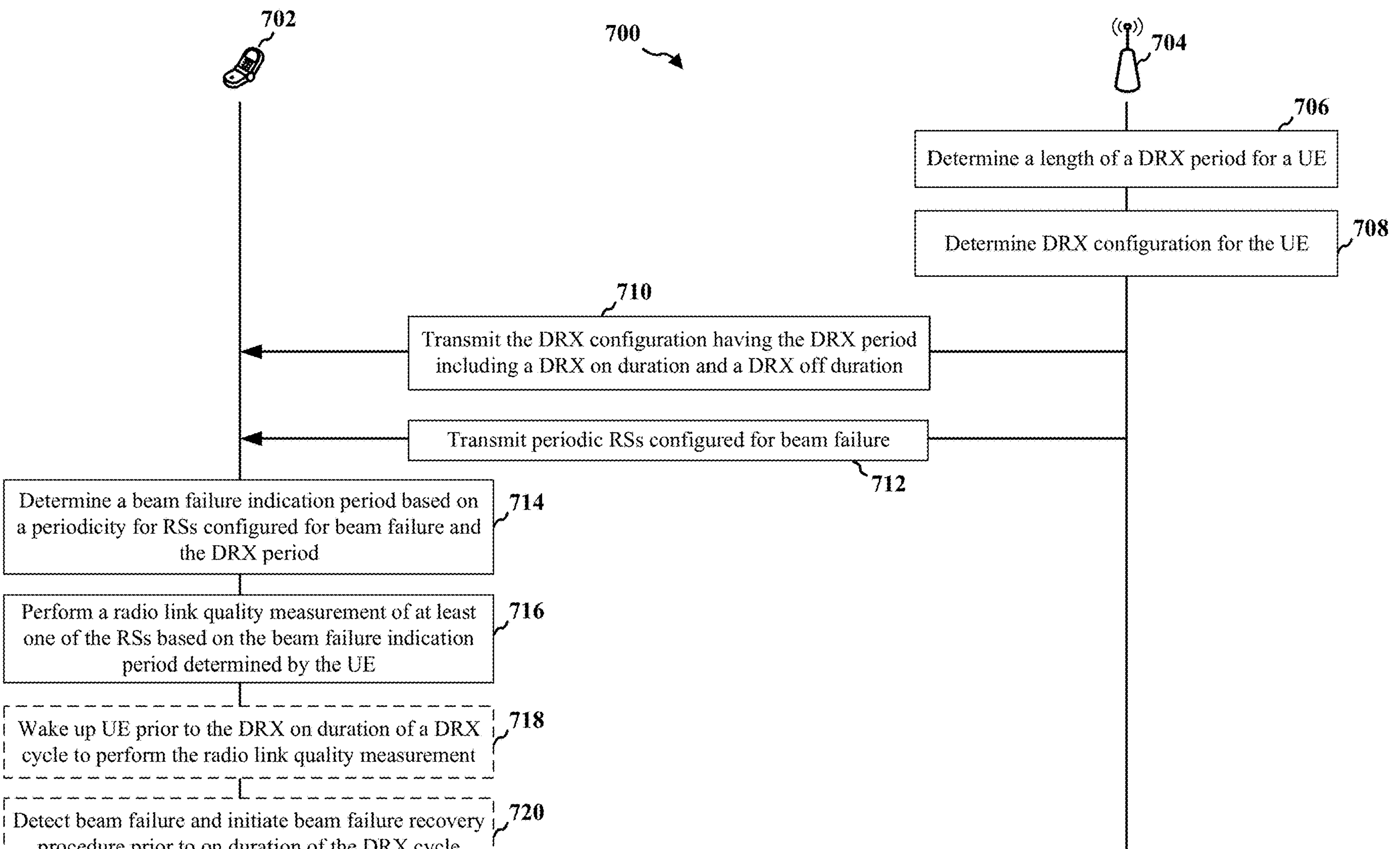
FIG. 7 illustrates an example communication flow between a base station and a UE.

FIG. 7 illustrates an example of communication 700 between a base station 704 and a UE 702. The base station 704 may be configured to determine a length of a DRX period for a UE in accordance with the examples 500, 600 of FIGS. 5 and 6, respectively. Base station 704 may correspond to, e.g., base station 102, 180, 310, 402, 1250, apparatus 902/902'. The UE 702 may correspond to, e.g., UE 104, 350, 404, 950, apparatus 1202/1202'. The communication between the base station 704 and UE 702 may comprise beamformed communication, as described in connection with FIG. 4. One or more of the illustrated operations may be omitted, transposed, or contemporaneous. Optional aspects are illustrated with a dashed line.

At 706, the base station 704 determines a length of a DRX period for a UE. In some examples, the DRX period may be based on a delay sensitivity of the UE. In some examples, the base station may be configured to determine the delay sensitivity of the UE. The delay sensitivity may be a sensitivity to latency, which may be based on a delay requirement of an application. For example, for voice over IP (VOIP), a jitter may be limited to no more than 40 ms. This may place limitations on the DRX period, e.g., limiting it to no more than 40 ms, because new DL packets arriving right after the UE enters the off duration would have to wait the entire off duration before sending the data to the UE. Delay sensitivity may also correspond to a latency requirement for beam failure detection and beam failure recovery. The latency requirement for BFD/BFR may depend on reliability or outage requirements of an application operating at the UE. In some examples, the base station may determine a shorter length of the DRX period when the UE is more sensitive to latency in beam failure detection, e.g., based on reliability and/or outage requirements of an application at the UE. In some examples, the base station may determine a longer length of the DRX period when the UE is less sensitive to latency in beam failure detection. At 708, the base station 704 determines a DRX configuration based on the determined DRX period from 706. The DRX configuration has the DRX period including a DRX on duration and a DRX off duration. At 710, the base station 704 transmits the DRX configuration having the DRX period to the UE, e.g., may configure the UE for DRX. At 712, the base station transmits periodic RSs configured for beam failure detection. Although illustrated with a single line, the periodic transmission of the RS will involve multiple, periodic transmissions of the RS, as illustrated in connection with FIGS. 5 and 6. In some examples, the base station may be configured to apply a different set of parameters for a beam failure detection procedure when the UE is in a DRX mode. The different set of parameters may include at least one of a failure detection counter for the DRX mode and a failure detection timer for the DRX mode. The parameters may be indicated to the UE in the DRX configuration transmitted at 710.

Upon receipt of the DRX configuration having the DRX period including the DRX on duration and the DRX off duration from the base station 704, the UE 702 at 714, determines a beam failure indication period. The beam failure indication period may be based on a periodicity for RSs configured for beam failure detection and a DRX period, as described in connection with the examples of FIGS. 5 and 6. In some examples, the beam failure indication period may be determined to be a maximum between a shortest periodicity for the RSs that the UE uses to assist the radio link quality and the DRX period.

At 716, the UE 702 may be configured to perform a radio link quality measurement of at least one of the RSs. The radio link quality measurement of the RSs may be performed based on the beam failure indication period determined by the UE. For example, the UE may perform the radio link quality measurement according to the periodicity of the RSs when the periodicity of the RSs is larger than the DRX period. The UE may perform the radio link quality measurement once during the DRX period, when the periodicity of the RSs is smaller than the DRX period. In such instance, the measurement may be performed during the DRX on duration of the DRX period.

At 718, the UE 702 may wake up prior to the DRX on of a DRX cycle to perform the radio link quality measurement. At 720, the UE 702 may detect a beam failure. Upon detecting a beam failure, the UE 702, may initiate a beam failure recovery procedure prior to the on duration of the DRX cycle. This may ensure that the beam quality is good or enable the UE to initiate BFR prior to the on duration so that the UE is ready to receive data during the on duration.

Figure 8:
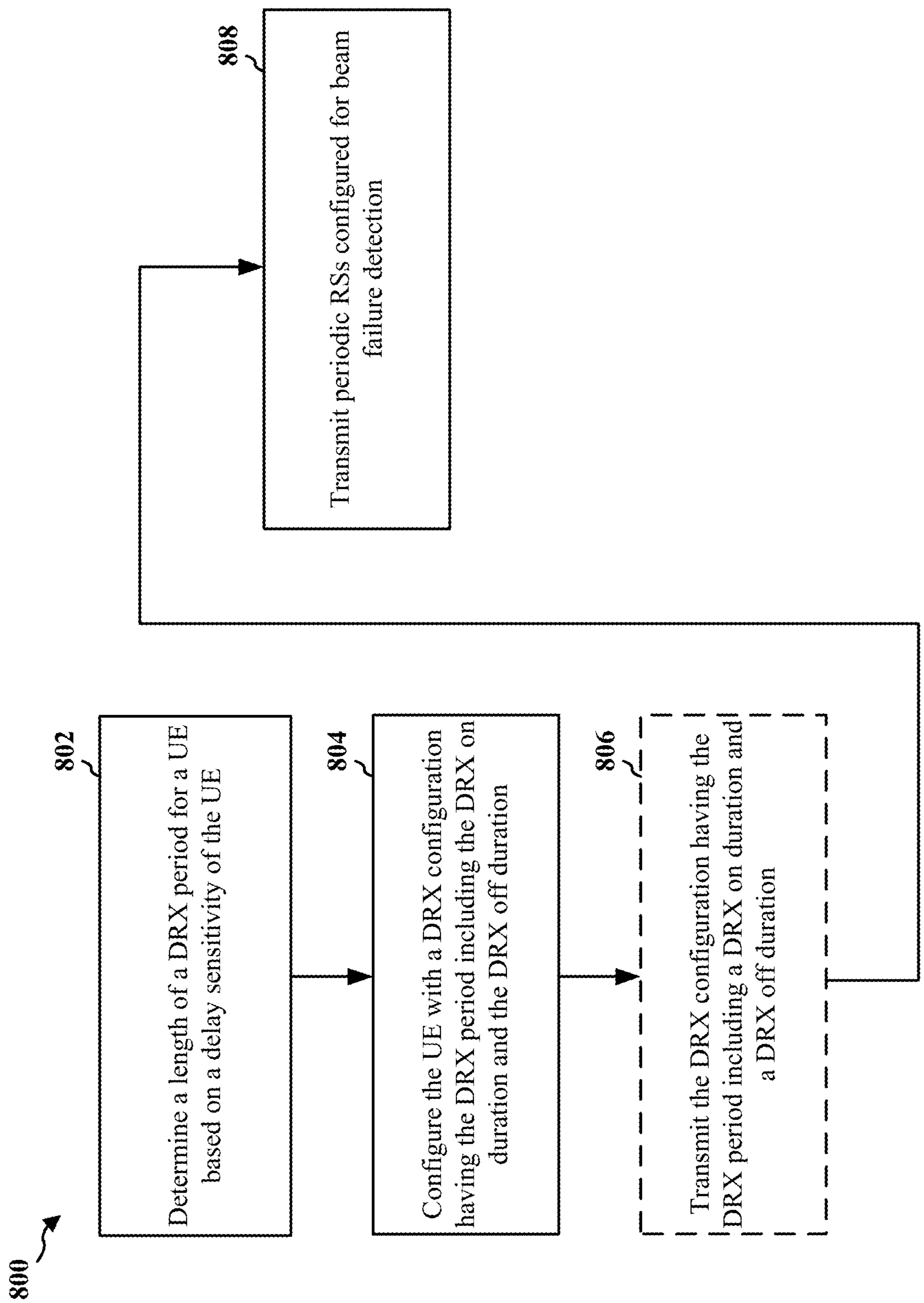
FIG. 8 is a flowchart of a method of wireless communication.

FIG. 8 is a flowchart 800 of a method of wireless communication. The method may be performed by a base station or a component of a base station (e.g., the base station 102, 180, 310, 402, 704, 1250, apparatus 902/902'; the processing system 1014, which may include memory 376 and which may be the entire base station 310 or a component of the base station 310, as the TX processor 316, the RX processor 370, and/or the controller/processor 375) communicating with a UE (e.g., UE 104, 350, 404, 702, 950, apparatus 1202/1202'). Optional aspects are illustrated with a dashed line. The method may enable a base station to configure a DRX period for a UE based on delay sensitivity of a UE.

At 802, the base station may determine a length of a DRX period for a UE based on a delay sensitivity of the UE. For example, DRX period component 906 of apparatus 902 may perform the determination. Thus, the base station may determine the delay sensitivity of the UE. The delay sensitivity may be a sensitivity to latency, which may be based on a delay requirement of an application. For example, for VOIP, a jitter may be limited to no more than 40 ms. This may place limitations on the DRX period, e.g., limiting it to no more than 40 ms, because new DL packets arriving right after the UE enters the off duration would have to wait the entire off duration before sending the data to the UE. Delay sensitivity may also correspond to a latency requirement for beam failure detection and beam failure recovery. The latency requirement for BFD/BFR may depend on reliability or outage requirements of an application operating at the UE. The base station determines the length of the DRX period. In some examples, the base station may determine a shorter length of the DRX period when the UE is more sensitive to latency in beam failure detection. In some examples, the base station may determine a longer length of the DRX period when the UE is less sensitive to latency in beam failure detection. The base station may determine the length of the DRX period for the UE in accordance with the examples 500, 600 of FIGS. 5 and 6, respectively.

At 804, the base station may configure the UE with a DRX configuration having the DRX period including the DRX on duration and the DRX off duration, based on the length of the DRX period determined at 802. For example, DRX configuration component 908 of apparatus 902 may perform the configuration. FIG. 7 illustrates an example 708 of the base station configuring the UE with a DRX configuration having the DRX period including the DRX on duration and the DRX off duration. As part of configuring the UE with the DRX configuration, at 806, the base station may transmit, to the UE, the DRX configuration having an indication of the DRX period including the DRX on duration and the DRX off duration. For example, transmission component 912 may perform the DRX configuration transmission. FIG. 7 illustrates an example at 710 of the base station transmitting the DRX configuration, to the UE, having the DRX period including the DRX on duration and the DRX off duration.

At 808, the base station transmits periodic RSs configured for beam failure detection, e.g., as illustrated in the examples of FIGS. 5 and 6. For example, periodic RSs component 910 may perform the transmission. FIG. 7 illustrates an example 712 of the base station transmitting the periodic RSs, to the UE, configured for beam failure detection. In some examples, the UE may apply a different set of parameters for a beam failure detection procedure when the UE is in a DRX mode. The different set of parameters may include at least one of a failure detection counter for the DRX mode and a failure detection timer for the DRX mode. However, other parameters may be utilized and the disclosure is not intended to be limited to the aspects disclosed herein. The different parameters may be determined by the base station and indicated to the UE, in one example.

Figure 9:
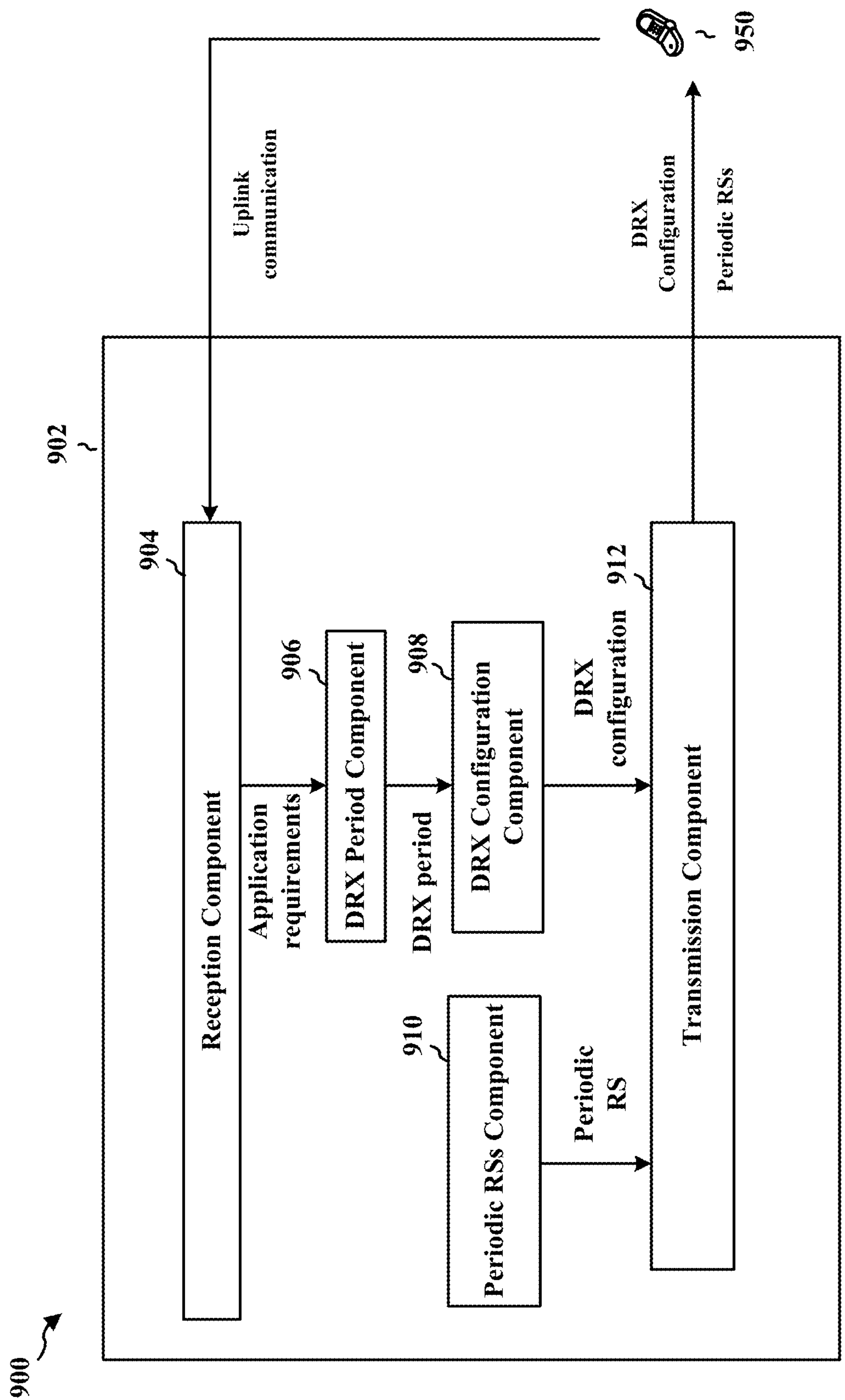
FIG. 9 is a conceptual data flow diagram illustrating the data flow between different means/components in an example apparatus.

FIG. 9 is a conceptual data flow diagram 900 illustrating the data flow between different means/components in an example apparatus 902. The apparatus may be a base station or a component of a base station (e.g., the base station 102, 180, 310, 402, 704, 1250, apparatus 902/902') in wireless communication with a UE (e.g., UE 104, 350, 404, 702, 950, apparatus 1202/1202'). The apparatus includes a reception component 904 that receives uplink communication from UE 950, and a transmission component 912 that transmits downlink communications to the UE 950. The apparatus includes a DRX period component 906 that determines a length of a DRX period for the UE, e.g., as described in connection with 802 of FIG. 8. In some examples, the apparatus may determine the delay sensitivity of the UE. The delay sensitivity may be determined based on at least one of mobility of the UE, channel conditions experienced by the UE, or reliability or outage requirement of an application. The DRX period component 906 determines the length of the DRX period for the UE, as described in connection with FIGS. 5 and 6. The length of the DRX period may be based on a delay sensitivity of the UE. The apparatus includes a DRX configuration component 908 that configures the UE with a DRX configuration having the DRX period including a DRX on duration and a DRX off duration, e.g., as described in connection with 804 of FIG. 8. The apparatus includes a periodic RSs component 910, such that the apparatus transmits periodic RSs configured for beam failure detection, e.g., as described in connection with 808 of FIG. 8.

The apparatus may include additional components that perform each of the blocks of the algorithm in the aforementioned flowcharts of FIGS. 7 and 8. As such, each block in the aforementioned flowcharts of FIGS. 7 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
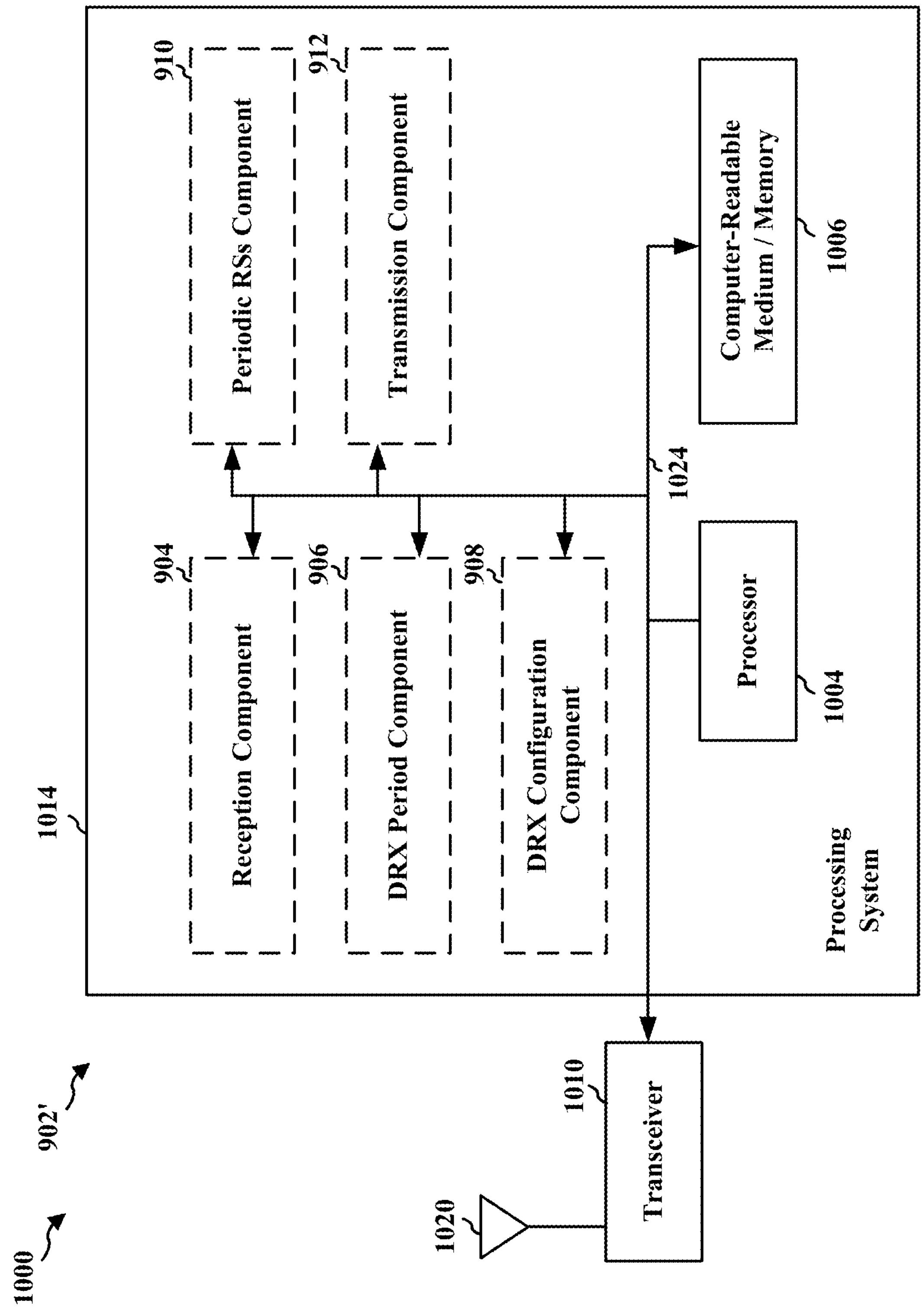
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, 912 and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 912, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910, 912. The components may be software components running in the processor 1004, resident/stored in the computer readable medium/memory 1006, one or more hardware components coupled to the processor 1004, or some combination thereof. The processing system 1014 may be a component of the base station 310 and may include the memory 376 and/or at least one of the TX processor 316, the RX processor 370, and the controller/processor 375. Alternatively, the processing system 1014 may be the entire base station (e.g., see 310 of FIG. 3).

In one configuration, the apparatus 902/902' for wireless communication includes means for determining a length of a DRX period for a User Equipment (UE) based on a delay sensitivity of the UE, means for configuring the UE with a DRX configuration having the DRX period comprising a DRX on duration and a DRX off duration, means for transmitting periodic Reference Signals (RSs) configured for beam failure detection, and means for determining the delay sensitivity of the UE. The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 11:
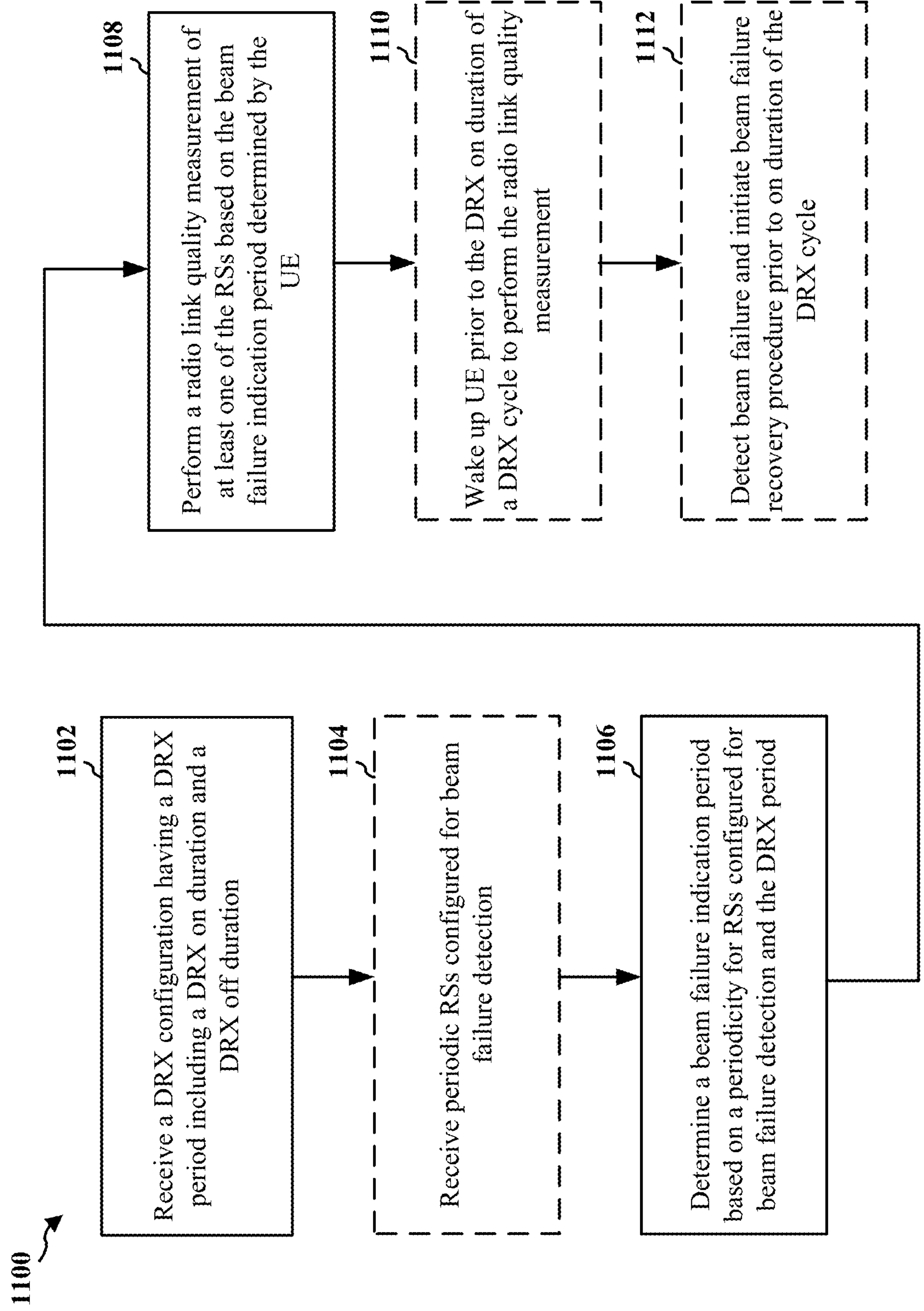
FIG. 11 is a flowchart of a method of wireless communication.

FIG. 11 is a flowchart 1100 of an example method of wireless communication. The method may be performed by a UE or a component of a UE (e.g., UE 104, 350, 404, 702, 950, apparatus 1202/1202'; the processing system 1314, which may include the memory 360 and which may be the entire UE 350 or a component of the UE 350, such as the TX processor 368, the RX processor 356, and/or the controller/processor 359) communicating with a base station (e.g., the base station 102, 180, 310, 402, 704, 1250, apparatus 902/902'). Optional aspects are illustrated with a dashed line. The method may enable a UE to benefit from power savings of DRX while performing BFD, by not requiring the UE to wake up while in the DRX off duration to perform BFD measurements and ensuring that the UE performs BFD measurements during the DRX active time or on duration.

At 1102, the UE receives a DRX configuration having a DRX period including a DRX on duration and a DRX off duration. The length of the DRX period may be based on a delay sensitivity of the UE. For example, DRX component 1206 of apparatus 1202 may receive the DRX configuration. FIG. 7 illustrates an example at 710 of the UE receiving a signal from the base station. The signal provides the DRX configuration having the DRX period including the DRX on duration and the DRX off duration. At 1104, the UE may receive periodic RSs configured for beam failure detection. For example, reception component 1204 may receive the periodic RSs. FIG. 7 illustrates an example 712 of the UE receiving period RSs configured for beam failure detection. At 1106, the UE may determine a beam failure indication period based on a periodicity for RSs configured for beam failure detection and the DRX period. The beam failure indication period may be determined to be a maximum between a shortest periodicity for the RSs and the DRX period. For example, beam failure indication period component 1208 may perform the determination. FIG. 7 illustrates an example 714 of the UE determining the beam failure indication period.

At 1108, the UE performs a radio link quality measurement of at least one of the RSs based on the beam failure indication period determined by the UE. For example, radio link quality measurement component 1210 may perform the measurements. The UE may perform the radio link quality measurements according to the periodicity of the RSs when the periodicity of the RSs is larger than the DRX period. The UE performs the radio link quality measurement once during the DRX period, when the periodicity of the RSs is smaller than the DRX period. The radio link quality measurement may be performed during the DRX on duration of the DRX period. FIG. 7 illustrates an example 716 of the UE performing radio link quality measurements.

At 1110, the UE may be configured to wake up prior to the DRX on duration of a DRX cycle to perform the radio link quality measurements. For example, wake up component 1214 may perform the waking up of the UE. FIG. 7 illustrates an example 718 of the UE waking up prior to the DRX on duration of a DRX cycle to perform radio link quality measurements. At 1112, the UE may detect beam failure and initiate beam failure recovery procedure prior to on duration of the DRX cycle. For example, beam failure detection component 1216 may perform the detection, while beam failure recovery component 1218 may perform the recovery procedure. FIG. 7 illustrates an example 720 of the UE detecting a beam failure and initiating beam failure recovery procedure prior to on duration of the DRX cycle.

Figure 12:
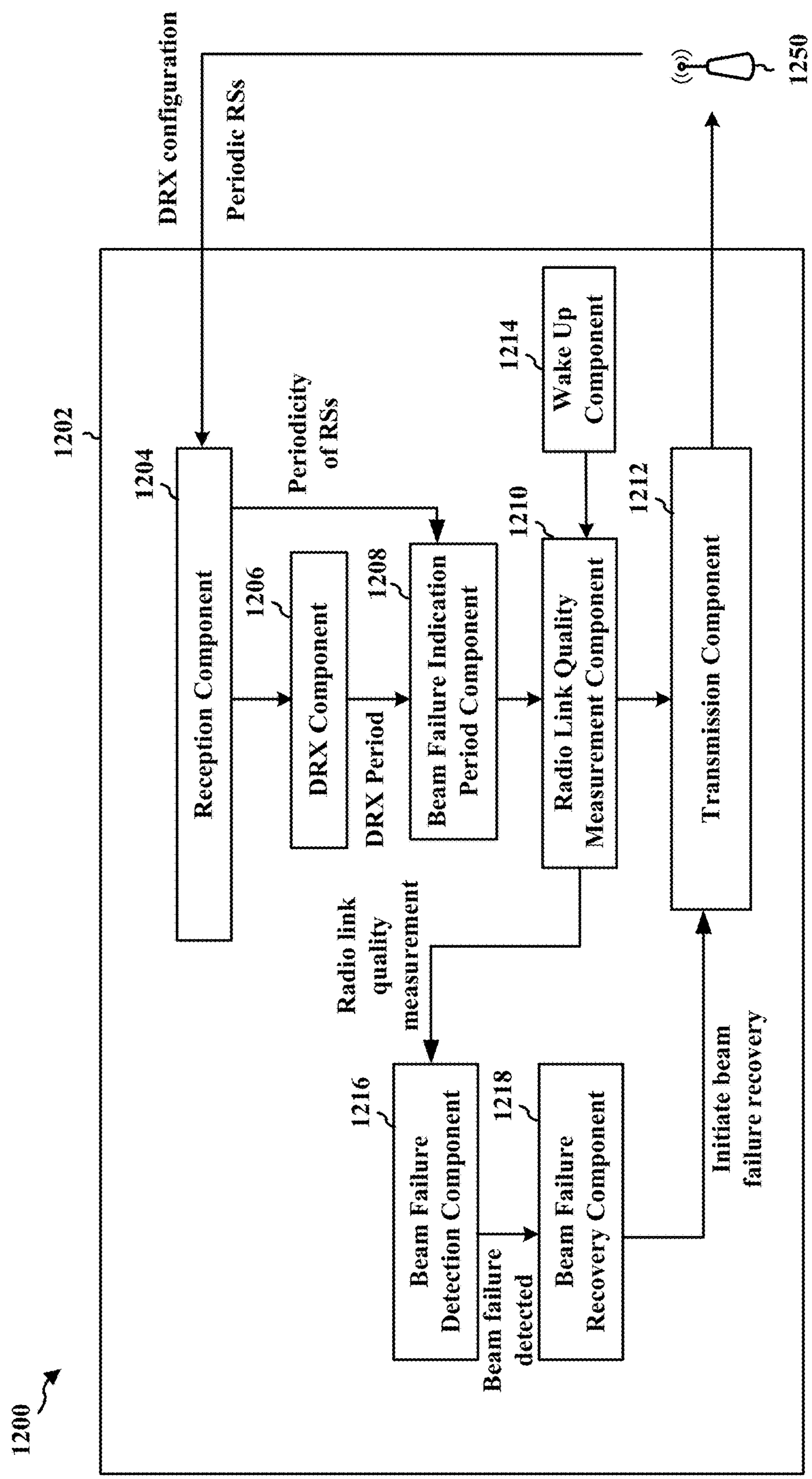
FIG. 12 is a conceptual data flow diagram illustrating the data flow between different means/components in an example apparatus.

FIG. 12 is a conceptual data flow diagram 1200 illustrating the data flow between different means/components in an example apparatus 1202. The apparatus may be a UE or a component of a UE (e.g., UE 104, 350, 404, 702, 950, apparatus 1202/1202') communicating with a base station (e.g., the base station 102, 180, 310, 402, 704, 1250, apparatus 902/902'). The apparatus includes a reception component 1204 that receives downlink communication from the base station 1250, and a transmission component 1212 that transmits uplink communications to the base station 1250. The apparatus includes a DRX component 1206 that is configured to receive the DRX configuration from the base station 1250, e.g., as described in connection with 1102 of FIG. 11. The DRX configuration may have the DRX period including the DRX on duration and a DRX off duration. The apparatus includes a beam failure indication period component 1208 that is configured to determine the beam failure indication period based on a periodicity for RSs configured for beam failure detection and a DRX period, e.g., as described in connection with 1106 of FIG. 11. The apparatus includes a radio link quality measurement component 1210 configured to perform radio link quality measurements of at least one of the RSs based on the beam failure indication period determined by the UE, e.g., as described in connection with 1108 of FIG. 11. The beam failure indication period may be determined to be a maximum between a shortest periodicity for the RSs and the DRX period. The UE may perform the radio link quality measurement according to the periodicity of the RSs when the periodicity of the RSs is larger than the DRX period. The UE may perform the radio link quality measurement once during the DRX period, when the periodicity of the RSs is smaller than the DRX period. The measurement may be performed during the DRX on duration of the DRX period. The apparatus includes a wake up component 1214 that is configured to wake up the UE prior to the DRX on duration of a DRX cycle to perform the radio link quality measurement, e.g., as described in connection with 1110 of FIG. 11. The apparatus includes a beam failure detection component 1216 that is configured to detect a beam failure, e.g., as described in connection with 1112 of FIG. 11. The apparatus includes a beam failure recovery component 1218 that is configured to initiate a beam failure recover procedure prior to the on duration of the DRX cycle, e.g., as described in connection with 1112 of FIG. 11.

The apparatus may include additional components that perform each of the blocks of the algorithm in the aforementioned flowcharts of FIGS. 10 and 11. As such, each block in the aforementioned flowcharts of FIGS. 10 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
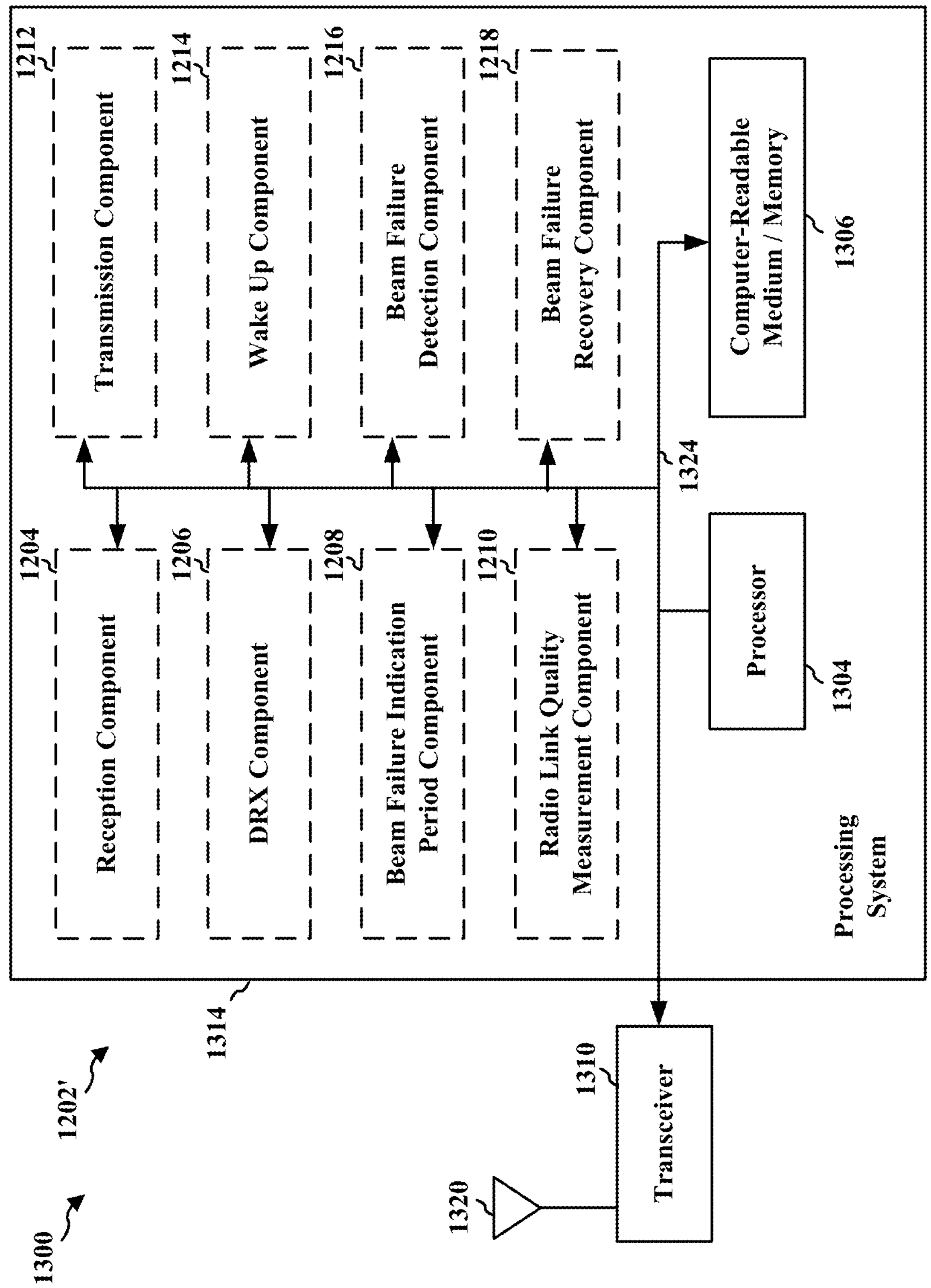
FIG. 13 is a diagram illustrating an example of a hardware implementation for an apparatus employing a processing system.

FIG. 13 is a diagram 1300 illustrating an example of a hardware implementation for the apparatus 1302' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, 1212, 1214, 1216, 1218 and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1212, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210, 1212, 1214, 1216, 1218. The components may be software components running in the processor 1304, resident/stored in the computer readable medium/memory 1306, one or more hardware components coupled to the processor 1304, or some combination thereof. The processing system 1314 may be a component of the base station 310 and may include the memory 376 and/or at least one of the TX processor 316, the RX processor 370, and the controller/processor 375. Alternatively, the processing system 1314 may be the entire UE (e.g., see 350 of FIG. 3).

In one configuration, the apparatus 1202/1202' for wireless communication includes means for receiving a DRX configuration having a DRX period comprising a DRX on duration and a DRX off duration, means for determining a beam failure indication period based on a periodicity for Reference Signals (RSs) configured for beam failure detection and a DRX period, means for performing a radio link quality measurement of at least one of the RSs based on the beam failure indication period determined by the UE, means for waking up prior to the DRX on duration of a DRX cycle to perform the radio link quality measurement, means for detecting a beam failure, and means for initiating a beam failure recovery procedure prior to the on duration of the DRX cycle. The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The following examples illustrate example embodiments. These embodiments and aspects of these embodiments may be used in combination with any previous embodiments or aspects of the previous embodiments disclosed or discussed in relation to the systems, methods, or devices of the figures.

Example 1 is a method of wireless communication at a User Equipment (UE) that includes receiving a DRX configuration having a DRX period comprising a DRX on duration and a DRX off duration, a beam failure indication period based on a periodicity for Reference Signals (RSs) configured for beam failure detection and a DRX period, and performing a radio link quality measurement of at least one of the RSs based on the beam failure indication period determined by the UE.

In Example 2, the method of example 1 further includes that the beam failure indication period is determined to be a maximum of duration based on between a shortest periodicity for the RSs and based on the DRX period.

In Example 3, the method of any of examples 1-2 may include that the UE performs the radio link quality measurement based on the periodicity of the RSs when the periodicity of the RSs is larger than the DRX period.

In Example 4, the method of any of examples 1-3 may include that the UE performs the radio link quality measurement based on the DRX period, when the periodicity of the RSs is smaller than the DRX period.

In Example 5, the method of example 4 may include that the measurement is performed during the DRX on duration of the DRX period.

In Example 6, the method of any of examples 1-5 may include that the length of the DRX period is configured based on a delay sensitivity of the UE.

In Example 7, the method of any of examples 1-6 further includes waking up prior to the DRX on duration of a DRX cycle to perform the radio link quality measurement.

In Example 8, the method of example 7 further includes detecting a beam failure, and initiating a beam failure recovery procedure prior to the on duration of the DRX cycle.

Example 9 is a device including one or more processors and memory in electronic communication with the one or more processors storing instructions executable by the one or more processors to cause the system or apparatus to implement a method as in any of examples 1-8.

Example 10 is a method of wireless communication at a base station that includes determining a length of a DRX period for a User Equipment (UE) based on a delay sensitivity of the UE, configuring the UE with a DRX configuration having the DRX period comprising a DRX on duration and a DRX off duration, and transmitting periodic Reference Signals (RSs) configured for beam failure detection.

In Example 11, the method of example 10 may include that the base station determines a shorter length of the DRX period when the UE is more sensitive to latency in beam failure detection.

In Example 12, the method of any of examples 10-11 may include that the base station determines a longer length of the DRX period when the UE is less sensitive to latency in beam failure detection.

In Example 13, the method of any of examples 10-12 may include that the base station applies a different set of parameters for a beam failure detection procedure when the UE is in a DRX mode.

In Example 14, the method of example 13 may include that the different set of parameters comprises at least one of a failure detection counter for the DRX mode and a failure detection timer for the DRX mode.

In Example 15, the method of any of examples 10-14 further includes determining the delay sensitivity of the UE to latency in beam failure detection.

In Example 16, the method of example 15 may include that the delay sensitivity is determined based on at least one of a reliability or an outage requirement of an application at a UE.

Example 20 is a device including one or more processors and memory in electronic communication with the one or more processors storing instructions executable by the one or more processors to cause the system or apparatus to implement a method as in any of examples 10-16.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a User Equipment (UE), comprising:
- receiving a discontinuous reception (DRX) configuration having a DRX period comprising a DRX on duration and a DRX off duration;
- determining a beam failure measurement period based on a periodicity for Reference Signals (RSs) configured for beam failure detection and the DRX period; and
- performing a radio link quality measurement of at least one of the RSs based on the beam failure measurement period determined by the UE.

2. The method of claim 1, wherein determining the beam failure measurement period comprises determining a maximum between the periodicity for the RSs and the DRX period.

3. The method of claim 1, wherein the UE performs the radio link quality measurement once during the beam failure measurement period.

4. The method of claim 1, wherein the UE applies at least one of a failure detection counter or a failure detection timer for the DRX mode to perform the radio link quality measurement when the UE is in the DRX mode.

5. The method of claim 4, wherein the measurement is performed during the DRX on duration of the DRX period.

6. The method of claim 1, wherein a length of the DRX period is configured based on a delay sensitivity of the UE.

7. The method of claim 1, further comprising:
- waking up prior to the DRX on duration of a DRX cycle to perform the radio link quality measurement.

8. The method of claim 7, further comprising:
- detecting a beam failure; and
- initiating a beam failure recovery procedure prior to the on duration of the DRX cycle.

9. An apparatus for wireless communication at a User Equipment (UE), comprising:
- a memory; and
- at least one processor coupled to the memory and configured to:
  - receive a discontinuous reception (DRX) configuration having a DRX period comprising a DRX on duration and a DRX off duration;
  - determine a beam failure measurement period based on a periodicity for Reference Signals (RSs) configured for beam failure detection and the DRX period; and perform a radio link quality measurement of at least one of the RSs based on the beam failure measurement period determined by the UE.

10. The apparatus of claim 9, wherein determining the beam failure measurement period comprises determining a maximum between the periodicity for the RSs and the DRX period.

11. The apparatus of claim 9, wherein the UE performs the radio link quality measurement only once during the beam failure measurement period.

12. The apparatus of claim 9, wherein the UE applies at least one of a failure detection counter or a failure detection timer for the DRX mode to perform the radio link quality measurement when the UE is in the DRX mode.

13. The apparatus of claim 12, wherein the measurement is performed during the DRX on duration of the DRX period.

14. The apparatus of claim 9, wherein a length of the DRX period is configured based on a delay sensitivity of the UE.

15. The apparatus of claim 9, wherein the at least one processor is further configured to:

wake up prior to the DRX on duration of a DRX cycle to perform the radio link quality measurement.

16. The apparatus of claim 15, wherein the at least one processor is further configured to:

detect a beam failure; and initiate a beam failure recovery procedure prior to the on duration of the DRX cycle.

17. A method of wireless communication at a base station, comprising:

determining a length of a discontinuous reception (DRX) period for a User Equipment (UE) based on a delay sensitivity of the UE to latency in beam failure detection;

configuring the UE with a DRX configuration having the DRX period comprising a DRX on duration and a DRX off duration; and transmitting periodic Reference Signals (RSs) configured for beam failure detection.

18. The method of claim 17, wherein the base station determines a shorter length of the DRX period when the UE is more sensitive to latency in beam failure detection.

19. The method of claim 17, wherein the base station determines a longer length of the DRX period when the UE is less sensitive to latency in beam failure detection.

20. The method of claim 17, wherein the base station applies a different set of parameters for a beam failure detection procedure when the UE is in a DRX mode.

21. The method of claim 20, wherein the different set of parameters comprises at least one of a failure detection counter for the DRX mode and a failure detection timer for the DRX mode.

22. The method of claim 17, further comprising:

determining the delay sensitivity of the UE to latency in beam failure detection.

23. The method of claim 22, wherein the delay sensitivity is determined based on at least one of a reliability or an outage requirement of an application at the UE.

24. An apparatus for wireless communication at a base station, comprising:

a memory; and at least one processor coupled to the memory and configured to:

determine a length of a discontinuous reception (DRX) period for a User Equipment (UE) based on a delay sensitivity of the UE to latency in beam failure detection;

configure the UE with a DRX configuration having the DRX period comprising a DRX on duration and a DRX off duration; and transmit periodic Reference Signals (RSs) configured for beam failure detection.

25. The apparatus of claim 24, wherein the base station determines a shorter length of the DRX period when the UE is more sensitive to latency in beam failure detection.

26. The apparatus of claim 24, wherein the base station determines a longer length of the DRX period when the UE is less sensitive to latency in beam failure detection.

27. The apparatus of claim 24, wherein the base station applies a different set of parameters for a beam failure detection procedure when the UE is in a DRX mode.

28. The apparatus of claim 27, wherein the different set of parameters comprises at least one of a failure detection counter for the DRX mode and a failure detection timer for the DRX mode.

29. The apparatus of claim 24, the at least one processor further configured to:

determine the delay sensitivity of the UE to latency in beam failure detection.

30. The apparatus of claim 29, wherein the delay sensitivity is determined based on at least one of a reliability or an outage requirement of an application at the UE.

* * * * *